United States Patent
Rohner et al.

(10) Patent No.: US 12,085,386 B2
(45) Date of Patent: Sep. 10, 2024

(54) CAPACITIVE DISTANCE SENSOR

(71) Applicant: HEXAGON TECHNOLOGY CENTER GMBH, Heerbrugg (CH)

(72) Inventors: Marcel Rohner, Heiden (CH); Lukas Baumann, St. Gallen (CH); Michael Reiterer, Vilpian (IT); Claudio Iseli, Au (CH); Alberto Tarizzo, Balgach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 144 days.

(21) Appl. No.: 16/532,171

(22) Filed: Aug. 5, 2019

(65) Prior Publication Data

US 2020/0041311 A1    Feb. 6, 2020

(30) Foreign Application Priority Data

Aug. 6, 2018 (EP) .................................. 18187566

(51) Int. Cl.
- G01B 7/14 (2006.01)
- G01B 7/02 (2006.01)
- G01D 5/241 (2006.01)

(52) U.S. Cl.
CPC ............. G01B 7/144 (2013.01); G01B 7/023 (2013.01); G01D 5/241 (2013.01)

(58) Field of Classification Search
CPC ....... G01B 7/023; G01B 7/14; G01R 27/2605
USPC ................................................ 324/658–690
See application file for complete search history.

(56) References Cited

U.S. PATENT DOCUMENTS

| | | | |
|---|---|---|---|
| 4,187,460 A * | 2/1980 | Dauge | G01R 19/252 324/607 |
| 4,347,478 A | 8/1982 | Heerens et al. | |
| 4,737,699 A | 4/1988 | Wen | |
| 4,959,615 A * | 9/1990 | Andermo | G01D 5/2415 324/660 |
| 9,435,645 B2 | 9/2016 | Pettersson et al. | |
| 9,891,035 B2 | 2/2018 | Matsumoto et al. | |
| 10,196,741 B2 * | 2/2019 | Griffin | C23C 16/45544 |
| 2008/0018347 A1 * | 1/2008 | Morimoto | G01L 1/142 324/662 |
| 2010/0079154 A1 | 4/2010 | Busse-Grawitz | |
| 2011/0095771 A1 | 4/2011 | Reime | |
| 2011/0193574 A1 * | 8/2011 | De Boer | G01D 5/2417 324/688 |
| 2012/0041712 A1 | 2/2012 | Pettersson | |

(Continued)

FOREIGN PATENT DOCUMENTS

| | | |
|---|---|---|
| CN | 85100991 A | 9/1986 |
| CN | 101583850 A | 11/2009 |

(Continued)

OTHER PUBLICATIONS

Extended European Search Report Dated Mar. 6, 2019 as received in Application No. 18187566.7.

*Primary Examiner* — Jeff W Natalini
(74) *Attorney, Agent, or Firm* — Maschoff Brennan (57) ABSTRACT

A capacitive distance sensor for determining distances from an object, wherein the distance sensor has at least one sensor electrode and at least one compensation electrode. Deviations from an ideal parallel orientation of distance sensor and object and/or errors caused by capacitive edge effects can be compensated by means of the compensation electrode.

14 Claims, 7 Drawing Sheets

(56) References Cited

U.S. PATENT DOCUMENTS

| | | | | |
|---|---|---|---|---|
| 2013/0160554 A1* | 6/2013 | Chen | ............... | G01D 5/2417 |
| | | | | 73/632 |
| 2013/0207667 A1* | 8/2013 | Zibold | ............. | H03K 17/955 |
| | | | | 324/601 |
| 2014/0248574 A1* | 9/2014 | Yoon | ................. | A61C 13/08 |
| | | | | 433/199.1 |
| 2015/0233696 A1* | 8/2015 | Matsumoto | ........ | G01D 5/2417 |
| | | | | 324/688 |

FOREIGN PATENT DOCUMENTS

| | | | | |
|---|---|---|---|---|
| CN | 102782444 A | | 11/2012 | |
| EP | 0023732 | * | 2/1981 | ............ H01G 5/00 |
| WO | 2011/080309 A1 | | 7/2011 | |

\* cited by examiner

Prior Art

CAPACITIVE DISTANCE SENSOR

CROSS-REFERENCE TO RELATED APPLICATIONS

This application claims priority to European Patent Application No. 18187566, filed on Aug. 6, 2018. The foregoing patent application is herein incorporated by reference.

The invention relates to a capacitive distance measuring sensor according to the preamble of claim 1, a method according to claim 13 for determining distances using a distance sensor of this kind, and a computer program product according to claim 14.

FIELD OF THE INVENTION

Capacitive sensors for precisely measuring the distance to an object are known from the prior art. Such sensors are used for example in order to measure the distance between two parts of a precision bearing which are movable relative to one another or to monitor the gap between the two parts, for example the space or gap between the roller cage and the roller. Such precision bearings are used for example in precision-measuring machines or high-precision meters, such as theodolites, laser trackers or laser scanners, or also in precision manufacturing machines for precise manufacture of workpieces.

For example, the use of one or more capacitive distance sensors in the bearings of a 3-axis coordinate measuring machine (CMM) is described in U.S. 9,435,645 B2 in order to determine and/or monitor the distance of the movable bearing part from the guide, whereby deviations from the ideal or target distance can be ascertained and compensated as appropriate, which otherwise would lead to a falsification of the coordinates to be measured.

U.S. Pat. No. 9,891,035 B2 describes a capacitive distance sensor which is designed to measure the distance between two bearing parts which are movable relative to one another and for this purpose has a measurement range of approximately 0 to 100 micrometers. To this end, the distance sensor is attached to one of the two bearing parts, wherein the capacitance is formed by a sensor electrode and the area of the other bearing part arranged opposite the sensor electrode. In order to improve the measurement result, the distance sensor has a special design with specially shaped sensor electrode and guard electrodes.

A disadvantage of the distance sensor U.S. Pat. No. 9,891,035 B2, however, is that measurement errors which are caused by a tilting of the sensor or the sensor electrode, that is to say a deviation from the ideal parallel orientation of the capacitive areas relative to one another, cannot be compensated. Such deviations are caused for example by imprecise installation of the sensor or as a result of ageing processes or ambient influences, for example fluctuations in temperature. Furthermore, measurement errors which are caused by capacitive edge effects, that is to say effects created by a deviation from the theoretically ideal scenario of infinitely extended capacitive areas, can be compensated only with significant calibration effort. The distance sensor of U.S. Pat. No. 9,891,035 B2 thus presents a response behavior which is not linear relative to the inverse over the measurement range, as can be seen from FIGS. 4A-4C of U.S. Pat. No. 9,891,035 B2, which show the output voltage over the measurement distance. However, a linear relationship between the inverse of the capacitance or output voltage and the distance would be advantageous in respect of the measurement process. At best, the embodiment with a relatively large sensor electrode has linear behavior, albeit only approximately, however this is due to the necessary large extent of the sensor electrode at the expense of spatial resolution.

BRIEF SUMMARY OF THE INVENTION

The object of some aspects of the present invention therefore lie in providing an improved capacitive distance sensor.

A further object of some aspects of the present invention lie in providing a capacitive distance sensor having improved linear response behavior.

A further object of some aspects of the present invention lie in providing a capacitive distance sensor having tilt compensation.

A further object of some aspects of the present invention lie in providing a capacitive distance sensor having compensation of capacitive edge effects.

These objects are achieved in accordance with some aspects of the invention by the characterizing features of the independent claims or by features of the dependent claims, and these solutions are also developed by features of the dependent claims.

Some aspects of the present invention relate to a capacitive distance sensor for measuring the distance from an object, wherein the distance sensor preferably has a measurement accuracy in the sub-micrometer range to the micrometer range. The distance sensor has at least one first planar sensor electrode, wherein the sensor electrode, together with an opposite (surface) area of the object, is designed to form a capacitance that is dependent on the distance so that the distance can be determined on the basis of a capacitance measurement.

The capacitive distance sensor further has at least one separate tilt compensation electrode assigned to the first sensor electrode, wherein the sensor electrode and tilt compensation electrode lie in a plane, wherein the plane can also be a curved plane, and therefore measurement errors which are caused by deviations from an ideal parallelism of sensor electrode and opposite object area (that is to say tilt errors) can be compensated on the basis of the capacitances of the tilt compensation electrode.

A further aspect of the present invention relates to a capacitive distance sensor which, besides the above-described first sensor electrode, has at least one separate edge effect compensation electrode—assigned to the first sensor electrode in the same plane. This edge effect compensation electrode has the same circumference as the first sensor electrode, but different (effective) area, so that measurement errors which are caused by capacitive edge effects of the first sensor electrode can be compensated by means of the capacitance of the edge effect compensation electrode.

Preferred embodiments have both an edge effect compensation electrode and a tilt compensation electrode, wherein in particularly advantageous embodiments the two compensation electrodes are identical, i.e. both functions are performed by one compensation electrode. In other words, the at least one compensation electrode is designed such that it can be used not only to compensate for deviations from the ideal parallel orientation of the sensor electrode or the sensor but also to compensate for deviations from the ideal/theoretical edgeless or infinitely extended sensor electrode.

In accordance with some aspects of the invention, the capacitive distance sensor, in addition to the actual or primary sensor electrode, thus also has at least one further capacitive compensation electrode, such that, besides the main capacitance, two auxiliary or secondary capacitances are also provided and are configured such that any tilting of the sensor influencing the main capacitance can be counter-balanced or, as appropriate, the extent of the tilt can be ascertained and taken into consideration when determining the distance, and/or capacitances of the edge of the sensor electrode interfering with the distance measurement (or evaluation of only poorly accessible capacitances of this kind) can be compensated.

The compensability is particularly advantageous insofar as the capacitive distance sensor thus presents a linear response behavior. In other words, a distance can be determined by means of the compensation electrode(s), wherein there is a linear relationship between (inverse of the) distance and measured capacitance. Such a linear behavior makes it possible to easily calibrate the distance sensor, wherein for example it is possible to dispense with a complex creation of lookup tables (the use of which in the measurement evaluation is in turn relatively complex), and also enables a comparatively simple evaluation device and/or evaluation procedure, and therefore a simple and quick determination of the sought distance.

In a preferred embodiment the capacitive distance sensor, in addition to the first sensor electrode, also has at least one second planar sensor electrode, which is structurally identical to the first sensor electrode, is arranged in the same plane as the first sensor electrode, and is electrically responsive identically but oppositely, such that the distance can be determined on the basis of a differential capacitance measurement with the aid of the two sensor electrodes. The distance sensor thus has two sensor electrodes that can be charged with opposite polarity, by means of which a differential measurement process is provided. The measurement is thus independent of the impedance ratios of the opposite area, and there is no mutual influencing if a plurality of sensors perform a measurement on a common, i.e. electrically connected area. The second sensor electrode(s) is/are preferably assigned to compensation electrodes of this kind, as described above. For example, the two sensor electrodes are arranged directly next to one another and together are surrounded by, for example, two compensation electrodes, which in respect of edge effect compensation together have, on the whole, the same circumference as the two sensor electrodes and/or are used to compensate for any tilting of the (sensor) electrode plane.

In the preferred case that the top distance sensor with at least one first and one second sensor electrode has at least two compensation electrodes, the distance sensor has four charge integrators contacted or contactable to one of the electrodes each, such that in each case a first and a second sensor electrode and two compensation electrodes can be read out or evaluated simultaneously.

In a development of the capacitive distance sensor, all sensor electrodes and compensation electrodes together form a circular arrangement, which is symmetrical in the plane, wherein the sensor electrodes form circle segments and the compensation electrodes are arranged externally and concentrically with respect to the sensor electrodes.

For example, the order of the first and second sensor electrodes alternates, and the compensation electrodes form a ring around the sensor electrodes.

In a further development the electrodes have contact holes for electrical contacting, and the number of contact holes in the compensation electrode is equal to the number of contact holes in the sensor electrodes, wherein all sensor electrodes have the same number of contact holes, such that the influence of the contact points is the same everywhere.

Particularly in the case of an above-described symmetrical arrangement formed by the sensor electrodes and compensation electrodes, the contact holes are likewise arranged or placed symmetrically, such that the symmetry is unaffected.

In a further development the distance sensor has electrically shielded lines for electrically contacting the sensor and compensation electrodes, wherein the lines can be switched to the same electrical potential as the electrode in question (active shielding) and/or the distance sensor has at least one passive electrical shielding electrode at a fixedly defined electrical potential. The shielding electrodes shield each line individually or a plurality or all of the lines as a whole.

As a further option, the capacitive distance sensor is designed to perform a continuous real-time measurement of the distance to the object. In other words, the distance sensor is designed such that it is possible to monitor or permanently check the distance from the object or the distance between two objects, in particular it is also possible for a plurality of sensors to take a measurement simultaneously on the same opposite area without the use of multiplexing methods, such as a time multiplex.

Some aspects of the present invention additionally relate to a method for continuously determining the distance between two machine parts by means of the capacitive distance sensor according to the invention, wherein the two machine parts are intended for parallel displacement relative to one another along a defined guidance direction with a target distance of preferably at most 1000 micrometers. The displacement is preferably a displacement in translation, and in particular is a linear displacement, that is to say a movement with (ideally) just one degree of freedom (in translation), for example in a linear bearing.

In other words, in accordance with the method, the distance between the two machine parts is determined continuously and in real time by means of the capacitive distance sensor according to some aspects of the invention, whereby a dynamic monitoring or permanent checking of the distance or the uniformity or constancy of the parallel displacement is made possible.

In a development of the method the angle between sensor area and the opposite machine part is determined by means of the capacitive distance sensor, which is equipped with at least one tilt compensation electrode, in particular at least two such electrodes, which are used to compensate the deviations from the ideal parallelism. The distance sensor according to the invention is thus used in order to ultimately determine the angle between the two machine parts or the extent of any deviation from the parallelism of the two machine parts relative to one another or from the parallelism of the displacement movement.

Some aspects of present invention also relate to a precision bearing, in particular a (hydrodynamic) plain bearing or air bearing, magnetic bearing or rolling bearing, with two parts movable relative to one another, in particular in a plane. The two parts are preferably displaceable relative to one another in the form of a movement in translation. In particular, the movement is a linear movement, such that the bearing is a linear bearing. The precision bearing is characterized in that the bearing has at least one capacitive distance sensor according to the invention for measuring the distance between the two parts, in particular continuously.

For example, the observance of a target distance between the two bearing parts thus can be monitored by means of the distance sensor according to the invention. The precision bearings are in particular bearings in which such a target distance is up to 1000 micrometers and the deviations that are to be determined lie in the sub-micrometer range.

For example, the precision bearing is a precision bearing which is intended for use in a high-precision meter, in particular a coordinate measuring machine, theodolite, laser scanner or laser tracker. Alternatively or additionally, the precision bearing is intended for use in a precision machine tool, for example a CNC manufacturing apparatus and/or for use in a precision articulated arm, for example a robot arm.

Some aspects of the present invention also include a computer program product or computer data signal, embodied by an electromagnetic wave, with program code, for controlling and/or carrying out the method according to the invention for the capacitive measurement of distances. This preferably includes a machine-readable carrier, on which a computer program product of this kind is stored. In particular, the computer program product is intended to be run in the control system of a precision bearing according to the invention or a precision-measuring machine or manufacturing machine or an articulated arm using a precision bearing according to the invention.

Some aspects of the present invention offer the advantage of an improved, precise and real-time-capable measurement of a distance, in particular for example up to at most 1000 micrometers, from an object or the distance between two objects by being able to compensate for orientation errors and deviations from the ideal, infinitely extended sensor electrode by means of the provided compensation electrodes. The requirements placed on the manufacture and installation of such a distance sensor are thereby reduced and the measurement accuracy is increased with the same manufacturing requirements.

It is advantageous in particular that a linear capacitive response behavior of the distance sensor can be attained on account of the compensation electrodes, which enables a comparatively simple calibration and also signal evaluation and for example can be used to increase the measurement rate.

The distance sensor according to some aspects of the invention offers particular advantages in respect of the continuous distance determination between two objects moving relative to one another, for example machine parts or parts of a precision bearing. The capacitive distance sensor according to the invention enables a precise continuous determination or monitoring of the distance in real time of the two objects from one another, such that deviations from a target distance or an ideal distance can be compensated or taken into consideration.

A precision bearing according to some aspects of the invention which is equipped with a capacitive distance sensor enable a continuous checking of the distance of the bearing parts movable relative to one another. Depending on the embodiment, the distance can be determined explicitly and can be included for example in a 3D coordinate measurement taken by a coordinate measuring machine.

The capacitive distance sensor enables a more precise—in comparison with distance sensors of the prior art—and continuous distance measuring or monitoring in real time (>100 Hz). For example, a more precise or more sensitive and therefore more reliable or more meaningful bearing monitoring is thus possible. For example, irregularities in the running of the bearing can thus be ascertained earlier and/or more precisely, and therefore countermeasures can be taken more effectively.

BRIEF SUMMARY OF THE DRAWINGS

The capacitive distance sensor according to the invention and the method according to the invention as well as the precision bearing according to the invention will be described in greater detail hereinafter, purely by way of example, with reference to exemplary embodiments depicted schematically in the drawing.

More specifically, in the drawing

DETAILED DESCRIPTION

Figure 1A:
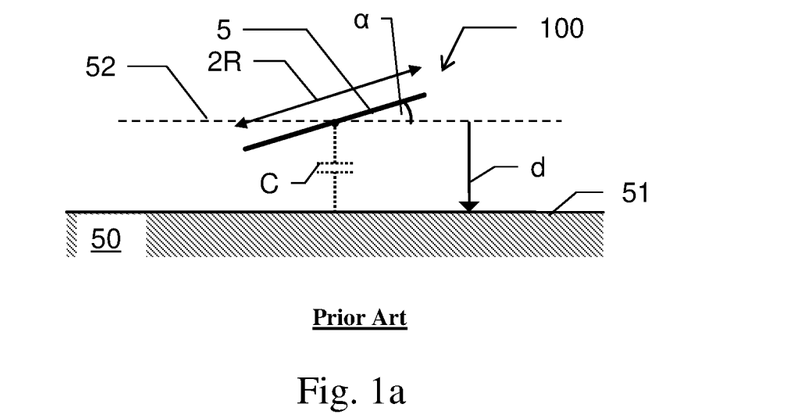
FIG. 1a schematically shows a capacitive distance sensor of the prior art.

FIG. 1a shows, in a schematically simplified manner and in a side view, a capacitive distance sensor 100 of the prior art, wherein, for simpler illustration, only the most essential components are shown. The sensor 100 is used to measure the distance d from an object 50 or to measure the gap d between the object 50 and a second object (not shown), to which the distance sensor 100 is attached. Both objects or the sensor 100 and the object 50 are displaceable relative to one another, parallel to the plane 52. For example, the two objects are the two parts of a precision bearing, for example the two sliding faces of an air bearing, which are displaceable in translation, for example linearly, along the direction 52 and have the air gap d from one another. Alternatively (also by way of illustration), the bearing is not a translatory bearing, but a rotary bearing, such that the plane 52 is curved and the sensor 100 can perform, for example, a 360° rotary movement along the plane. Precision bearings are installed for example in precision-measuring machines, such as coordinate measuring devices, total stations, laser trackers or laser scanners, and also in robot arms or CNC precision manufacturing machines.

In the ideal case, the objects are always moved relative to one another in parallel, i.e. the distance d is ideally constant (in the linear case there is ideally only one degree of freedom for the relative movement). In reality, however, deviations herefrom occur, i.e. the size d of the gap deviates over the movement range (displacement path) as a result of the manufacturing process or also as a result of ambient influences, such as changes in temperature or ageing-related phenomena. These deviations, for example in the case of a bearing of a precision-measuring machine, falsify the measurement results, or, in the case of a manufacturing facility, the accuracy of the workpiece manufactured by said facility. In order to therefore measure and/or monitor the distance d (for example in the form of a bearing monitoring) and thus be able to take into consideration and/or compensate the distance d or changes or deviations thereof from the target or ideal distance, the capacitive distance sensor 100 is now used.

The capacitive distance sensor 100 has a planar sensor electrode 5 with the length or diameter 2R. This forms, together with the (surface) area of an object 50 distanced therefrom, a capacitor or capacitance C. The magnitude of the capacitance C, as is known, is dependent on the distance d. The distance d can thus be determined by measuring the capacitance C.

With a prior art sensor 100, errors are nevertheless possible, however, since an erroneous consideration or determination of the distance d occurs if the orientation of the sensor electrode 5 relative to the object face 51 is not parallel thereto, but instead, as shown in FIG. 1a, is tilted and the two areas enclose an angle α with one another.

Such an undesirable tilt is created for example again by imprecise manufacture or also by ambient influences/ageing.

The actual capacitance C is then not easily calculated by $$C \propto \frac{1}{d},$$

but instead in accordance with:

$$C \propto \int_{-R}^{R} \frac{1}{d + \alpha \cdot x} dx = \frac{2}{\alpha} \operatorname{arctanh} \frac{\alpha \cdot R}{d} \approx \frac{2R}{d} + \frac{2}{3}\left(\frac{r}{d}\right)^2 \alpha^2 + O(\alpha^3) \quad (1)$$

Figure 1B:
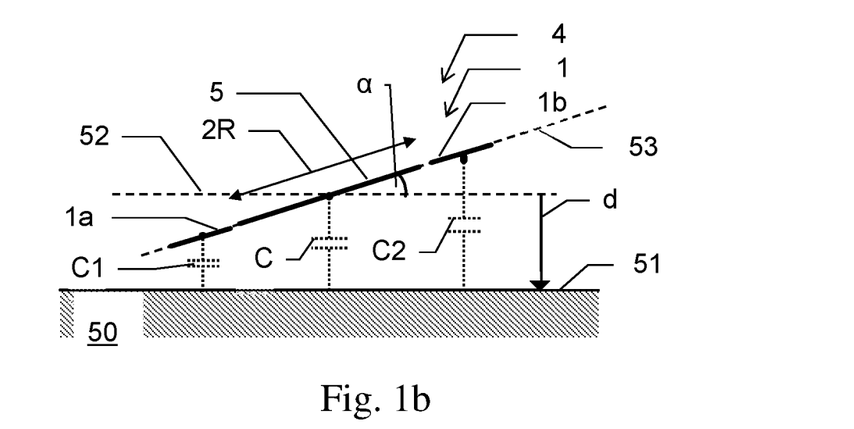
FIG. 1b schematically shows a first embodiment of a capacitive distance sensor according to the invention with tilt compensation, FIG. 2 schematically shows a second embodiment of a capacitive distance sensor according to the invention with compensation of capacitive edge effects, FIG. 3 schematically shows a schematic example of linear behavior of a capacitive distance sensor according to the invention, FIG. 4 schematically shows a further embodiment of a capacitive distance sensor according to the invention with differential measurement, FIG. 5 schematically shows, in plan view, a preferred embodiment of a capacitive distance sensor according to the invention with circular electrode arrangement, FIG. 6 schematically shows an example of a capacitive distance sensor according to the invention with evaluation circuit, FIG. 7 schematically shows an example of a capacitive distance sensor according to the invention with shielding, FIG. 8 schematically shows an example of a switching sequence of a capacitive distance sensor according to the invention with active shielding, FIG. 9 in an exploded oblique view shows a preferred embodiment of a capacitive distance sensor according to the invention, FIG. 10 schematically shows a cross-section of a precision rotary bearing, which is equipped with a capacitive distance sensor according to the invention, and FIG. 11 schematically shows a side view of a precision linear bearing, which is equipped with capacitive distance sensors according to the invention.

FIG. 1b shows, in a schematically simplified manner, a first embodiment of a capacitive distance sensor 4 according to the invention, with which any tilt or deviation from the ideal position of the distance sensor 4 or the sensor electrode 5 can be compensated or taken into consideration. The distance sensor 4 according to the invention for this purpose, in addition to the sensor electrode 2, has a tilt compensation electrode 1, which is separate from the sensor electrode 2 and which in the example is divided into two parts 1a, 1b in such a way that these parts are assigned to an end of the sensor electrode 2 each and are separated therefrom. Both electrodes 1, 2 lie in a plane 53. The compensation electrodes 1a and 1b form a capacitance C1 or C2 respectively with the object surface 51. Deviating from the illustration, embodiments in which the plane 53 is slightly curved or the sensor and compensation electrodes 1, 2, 3 are slightly curved, such that for example the three electrodes 1, 2, 3 form the arc of a circle, are also possible depending on the technical field of application. Such embodiments are advantageous for example for determining distance in the case of rotary relative movements, for example for determining distance within a rotary bearing (see FIG. 10).

The first and second compensation electrode parts 1a, 1b or the tilt compensation electrode 1 formed therefrom are shown here in such a way that the following is true:

$$C - C_1 - C_2 \propto \approx \frac{2R}{d} + O(\alpha^3) \quad (2)$$

With the distance sensor 4 according to the invention, the tilt of the sensor electrode 5 or of the plane 53 relative to the object area 51 is thus compensated, that is to say counterbalanced, and the tilt angle α is determined and is taken into consideration when determining the sought distance d.

Figure 2:
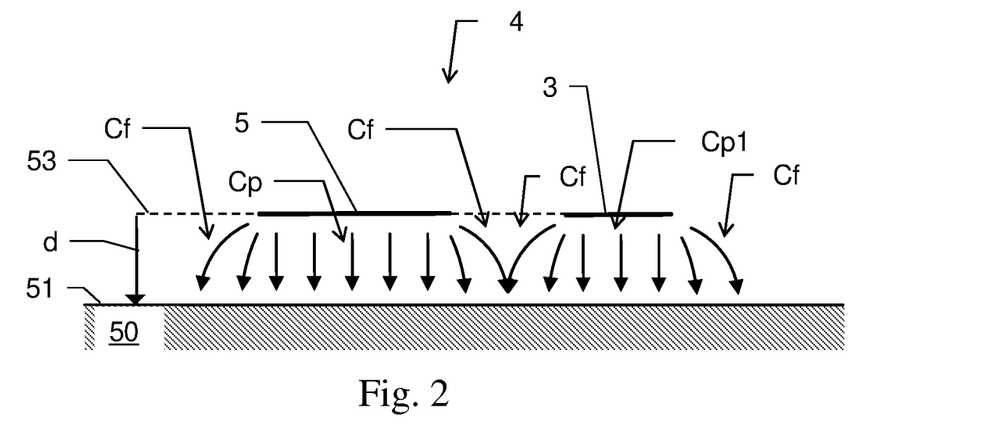

FIG. 2 shows a schematically simplified depiction in cross-section of a second embodiment of a capacitive distance sensor 4 according to the invention for measuring the distance d from an object 50. Besides the above-mentioned falsification of the measurement result on account of deviations from an ideal parallel orientation of the sensor 4 or the sensor electrode 5 relative to the object area 51, deviations from the ideal dependency $$C \propto \frac{1}{d}$$

also occur due to capacitive edge effects.

Since the extent of the sensor electrode 5 (along the direction 53) is limited, the entire capacitance C thereof, besides being composed of the "ideal" capacitance Cp of the inner region of the electrode 5, is also composed of electrical fields and/or capacitances Cf of the edge of the sensor electrode 5, such that (in accordance with the shown two-dimensional simplification) the following is given:

$$C = C_p + 2C_f \quad (3)$$

For compensation of these edge effects, the distance sensor 4 according to the invention, besides the sensor electrode 5, now has an edge effect compensation electrode 3, which lies in the same plane 52 as the sensor electrode 5 and is distanced therefrom or separated therefrom. The compensation electrode 3 is selected here such that it has an effective area of the inner region different from the sensor electrode 5, but the same circumference. In other words, the length of the edge of both electrodes 5 and 3 is the same, however their areas are different. The capacitance Cp1 of the inner region of the edge effect compensation electrode 3 thus differs from the "inner" capacitance Cp of the sensor electrode 5, the edge capacitances Cf, however, are the same. The capacitive value of the electrode edges can thus be compensated by forming a difference between the overall capacitances of the sensor electrode 5 and compensation electrode 3 or can be calculated as follows:

$$C = C_p + 2C_f - (C_{p1} + 2C_f) = C_p - C_{p1} \quad (4)$$

A total capacitance C is thus obtained which is independent of edge effects or edge capacitances. A capacitive sensor 4 of which the ideal or linear behavior is not disturbed by such edge effects is thus advantageously provided.

Figure 3:
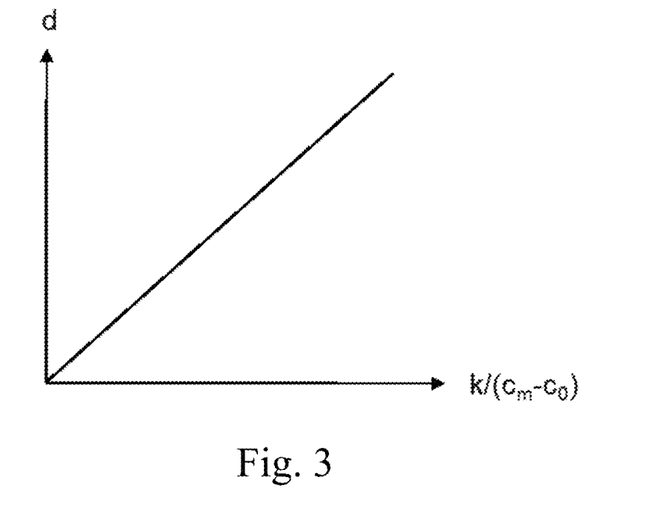

FIG. 3 schematically shows the linear behavior of a capacitive distance sensor according to the invention resulting from the above-described compensation of tilt errors or deviations from the ideal parallel orientation and compensation of capacitive edge effects. As a result of the above-proposed measures of the assignment of at least one appropriately designed compensation electrode, the sought distance d is dependent linearly on the measured capacitance c this (or inverse thereof), moreover across the entire measurement range.

This in particular, there is thus no need for lookup tables for calibration or fault fixing, which disadvantageously are relatively computing intensive and elaborate in respect of calibration. In order to ultimately determine the distance value d it is merely necessary to determine two parameters k and c) in a calibration process in accordance with the following equation (5), which for example is achieved by measuring the sensor capacitances cm1 and cm2 at just two known distances d1 and d2. From the relationship $$d_1 = \frac{k}{c_{m1} - c_0}, d_2 = \frac{k}{c_{m2} - c_0} \quad (5)$$

the parameter k and c0 are given as follows:

$$k = \frac{d_1 \cdot d_2}{d_1 - d_2}(c_{m2} - c_{m1}) \quad (6)$$

$$c_0 = \frac{1}{d_1 - d_2}(c_{m2} \cdot d_2 - c_{m1} \cdot d_1) \quad (7)$$

Thus, the present invention advantageously makes it possible to provide a simple compensation model for which merely the two above-mentioned premises have to be determined, which can be achieved in a very simple way.

Figure 4:
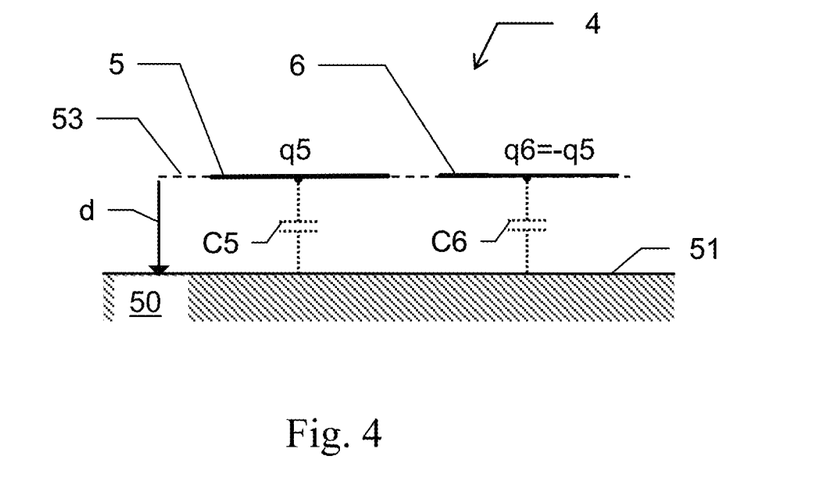

FIG. 4 shows, in a schematically simplified manner, and advanced development of a capacitive distance sensor 4 according to the invention in cross-section. Besides the compensation electrodes according to the invention as described above (omitted in the drawing for the sake of clarity), this distance sensor also has a second sensor electrode 6. This second sensor electrode is preferably arranged in the same plane 53 is the first sensor electrode and also corresponds otherwise to the first sensor electrode 5. In any case, the second sensor electrode 6 is arranged and embodied in such a way that the two capacitances are the same, i.e. the capacitance C1 of the first sensor electrode 5 is the same as the capacitance C2 of the second sensor electrode 6: C5=C6.

By means of the two sensor electrodes 5 and 6, a differential capacitance measurement or measurement evaluation is made possible, wherein the charge q5 of the first sensor electrode 5 is equal and opposite to the charge q6 of the second sensor electrode 6: q5=−q6. The charge of the object 50 moving or sliding relative to the electrodes 5, 6, induced in the counter electrode or counter area 51, is on the whole equal to zero: q5+q6=0. Due to the charge neutrality of the counter area, the measurement is on the one hand independent of the impedance conditions of the counter area. In addition, the mutual influencing of a plurality of sensors measuring over the same counter area is reduced or eliminated.

Figure 5:
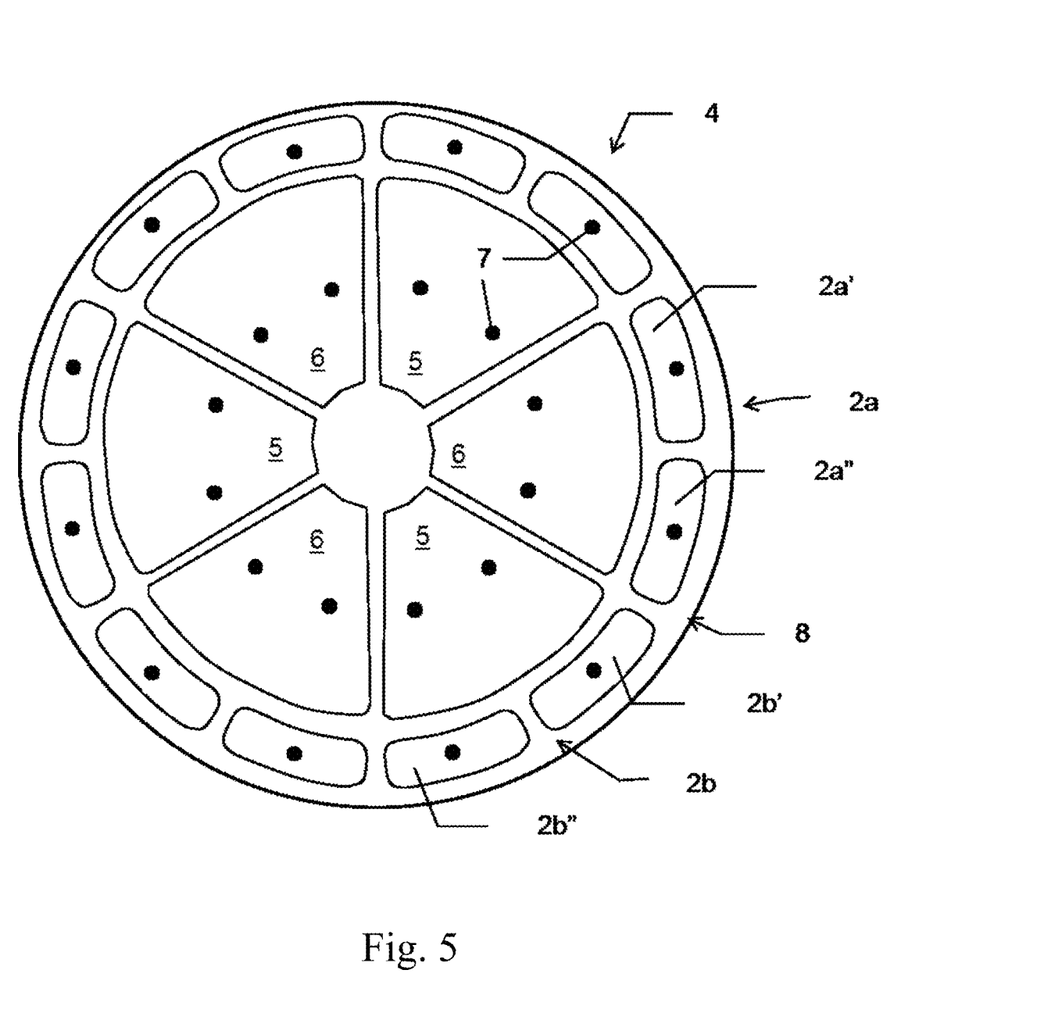

FIG. 5 schematically shows, in plan view, a preferred embodiment of a capacitive distance sensor 4 according to the invention. The distance sensor 4 has a first planar sensor electrode 5 and a second planar sensor electrode 6 for differential capacitance measurement as described above. The first and second sensor electrodes 5, 6 are arranged here in the form of three geometric electrodes or three electrode parts electrically contacted with one another and arranged in alternation and in a circular manner in the form of equal circle segments. With a distance sensor 4 of this kind, a measurement range in the micrometer range for example is covered, e.g. up to at most 100 micrometers or at best 1000 micrometers, wherein a measurement accuracy of less than one micrometer is achieved.

Compensation electrodes 2a, 2b are arranged in an annular manner around the sensor electrodes 5, 6. The ring 8 of compensation electrodes one, 3 is concentric with the circular arrangement of the sensor electrodes 5, 6.

The compensation electrodes 2a, 2b are used here both for tilt compensation, as described in relation to FIGS. 1a and 1b, and for compensation of capacitive edge effects, as described in relation to FIG. 2. The compensation electrodes 2a, 2b thus perform a dual function. They are selected such that on the one hand the relationship between sensor electrodes 5, 6 and compensation electrodes 2a, 2b is satisfied both in the sense of the above equation (2) and in the sense of the above equation (4), wherein the equations (2), (4) are adapted accordingly from the above-presented simple two-dimensional case for the three-dimensional case of the present example.

in the example, the compensation electrodes for this purpose are divided into twelve (geometric) electrodes 2a', 2a", 2b', 2b", wherein every two parts 2a', 2a" and 2b', 2b" are assigned to a sensor electrode part 5 or 6. The division into two compensation electrode parts 2a', 2a" and 2b', 2b" (instead of a single electrode) is implemented in order to provide the circumference necessary for the compensation function of edge effects: the circumference of two parts 2a', 2a" or 2b', 2b" in each case corresponds together to the circumference of one sensor electrode part 5 or 6.

On the whole, each first or second sensor electrode 5 or 6 is thus assigned, three times, two electrical compensation electrodes 2a' and 2a" or 2b', 2b", such that ultimately two compensation electrodes 2a and 2b are provided which are each assigned to one sensor electrode 5 or 6 and both compensate for tilt effects as well as edge effects.

Due to the provided capacitances of the compensation electrode ring 8, both a possible deviation from the ideal parallel orientation of the sensor 4 relative to the measurement area or object surface, and also the influence of the edges of the first and second sensor electrodes 5, 6 is compensated, for example by means of subtraction of the inner sensor electrode capacitance present in each case.

In the example the electrodes 2a, 2b have 3, 5 or 6 contact zones 7, for example contact bores/contact holes, for their electrical contracting. In order to ensure, in a simple manner, the above-mentioned proportionalities of the sensor electrodes 5, 6 to the compensation electrodes 2a, 2b in respect of the compensation or fault elimination, the sensor electrodes 5, 6 have two such contacts. The same contacting conditions for a particular region or a particular electrical polarity are thus provided, and the contact areas 7 do not have to be taken into consideration separately in the evaluation of the measured capacitances.

Figure 6:
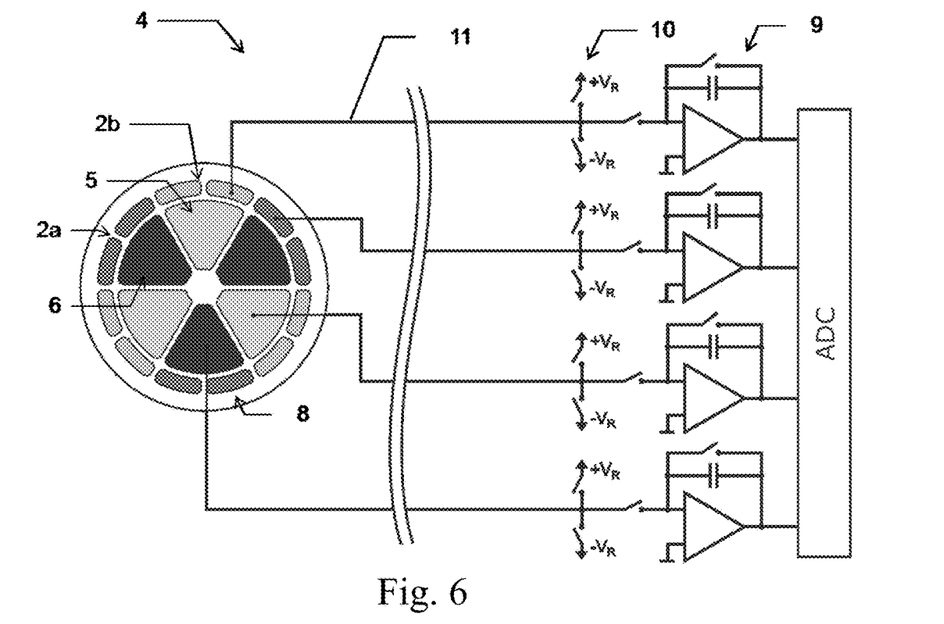

FIG. 6 schematically shows an example of an evaluation circuit of a capacitive distance sensor 4 according to the invention as described beforehand in conjunction with FIG. 5. By means of wires 11, the first and the second sensor electrode 5, 6 as well as the two compensation electrodes 2a, 2b of the compensation electrode ring 8 are contacted, such that four of these independent electrodes are charged simultaneously by means of the voltage sources 10 and then the corresponding charge or capacitance of these four electrodes 5, 6, 2a, 2b can be determined for example by means of a charge amplifier.

The electrodes or capacitors in question are charged by means of the voltage sources 10 with appropriately attached electronic switches, such that each electrode 5, 6, 2a, 2b is charged with the voltage +VR or −VR. The capacitance measurement is taken via four resettable analogue integrators 9, which convert the capacitive charges into voltage values. These voltages are then digitalized by an ADC converter.

Figure 7:
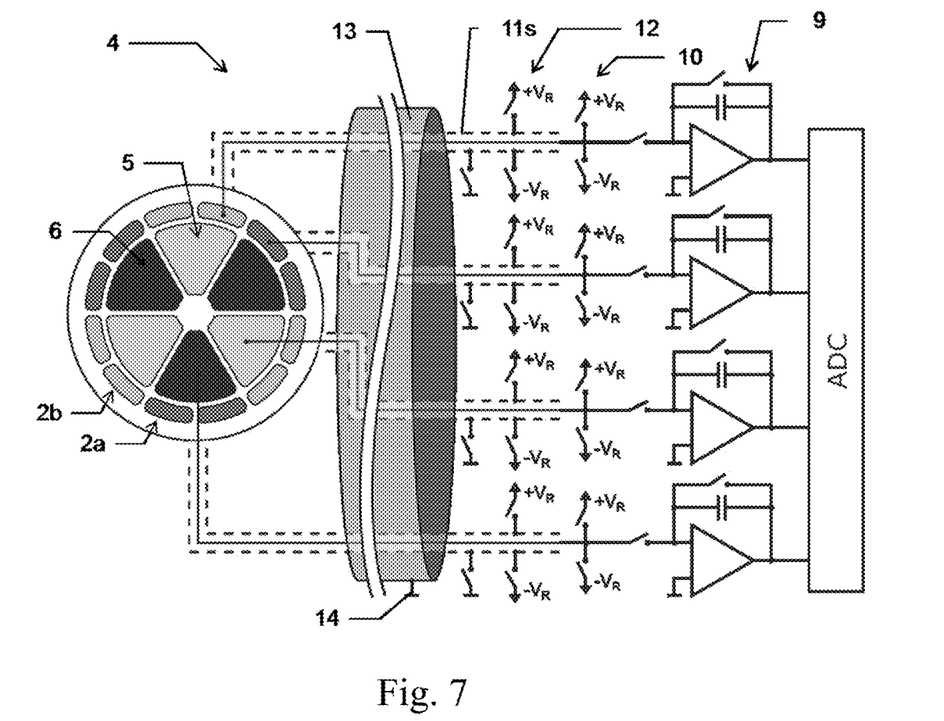

FIG. 7 schematically shows a development of the capacitive distance sensor 4 according to the invention in accordance with FIG. 6 above. In addition to the aforementioned features, the distance sensor 4 has shields 11s and 13, which shield the electrical connections between sensor electrodes 5, 6, 2a, 2b and evaluation electronics 9 ADC against external electromagnetic influences and thus reduce noise of the measurement signals.

On the one hand, electrically shielded lines 11s are used. In order to avoid parasitic capacitances, these are switched by means of additional switches or voltage sources 12 to the same potential +VR or −VR as the sensor electrodes 5, 6, 2a, 2b, such that an active shielding is provided.

On the other hand, the distance sensor 4 optionally has an additional passive shielding 13, which lies at a fixed or defined electrical potential 14. Influences disturbing the capacitance measurement are thus reduced even further. In the example, the passive shield 13 is configured such that all electrical connections are shielded thereby at once. Alternatively, the distance sensor 4 can have a plurality of such passive shieldings 13, such that for example each line 11s has its own shielding 13.

Figure 8:
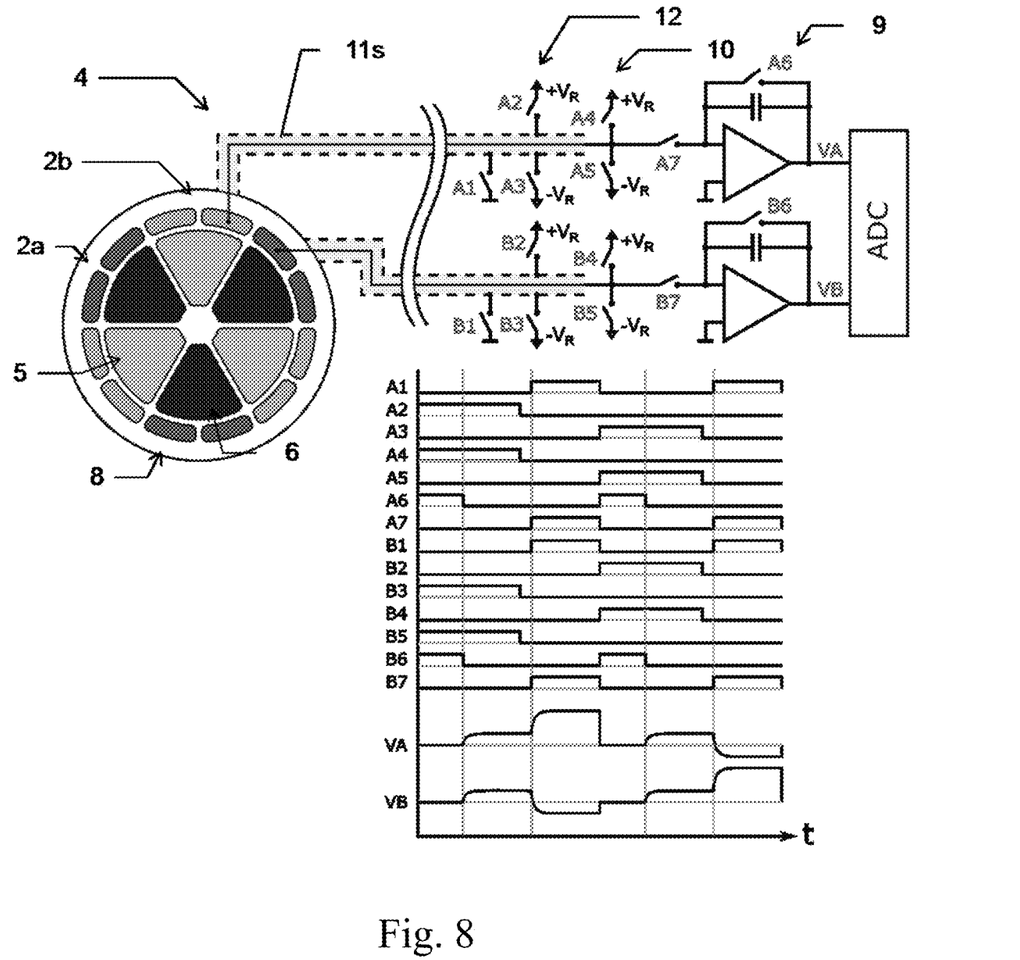

FIG. 8 schematically shows an example of a switching sequence of a capacitive distance sensor 4 according to the invention with active shielding according to the previous FIG. 7, wherein, for the sake of simpler illustration, only the circuit the compensation electrode ring 8 has been shown. With regard to the reading process, the (inner) first and second sensor electrodes 5, 6 and the outer ring 8 formed from compensation electrodes 2a, 2b can be treated as two capacitive sensors independent of one another.

FIG. 8 shows, at the top, the electrical circuit with lines 11s, potential sources 10 and 12, and integrators 9, which deliver the output signals VA and VB, wherein the necessary switches are denoted by A1-A7 and B1-B7. A switching sequence of the switches A1-A7 and B1-B7 and the resulting output voltages VA and VB are shown qualitatively thereebeneath in part. Inter alia, it can be seen that the electrodes are excited by opposite polarity, such that a differential measurement process is made possible. In addition, the switches are managed in such a way that charge affects which are generated by deviations from theoretical or ideal switching processes can be compensated in a post-processing (correlated double sampling).

Figure 9:
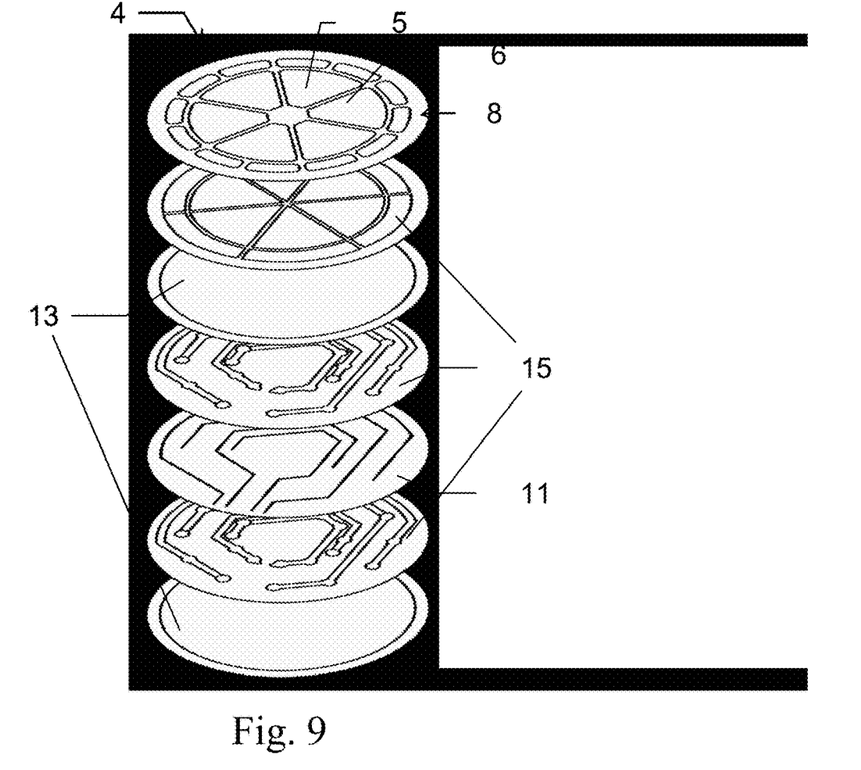

FIG. 9 shows, in an exploded oblique view, a preferred embodiment of a capacitive distance sensor 4 according to the invention. The cylindrical distance sensor 4 has "at the top" the actual effective circular area with the first and second sensor electrodes 5, 6 and the ring 8 of compensation electrodes (see FIG. 5). For shielding, there are a total of three (layers of) active shielding electrodes 15 and two (layers) with passive shielding 13. These are arranged successively in alternation, wherein a conductor layer 11 for contacting the sensor and compensation electrodes 5, 6, 8 is arranged directly between two layers of active shielding 15. Due to the arrangement of the "uppermost" layer with the sensor and compensation electrodes 5, 6, 8 and the conductor layer 11 adjacent only to layers of active shielding 15, temperature effects over the extent of the carrier (printed circuit board) are advantageously minimized. The present structure additionally enables a compact design, with the greatest possible shielding of interfering electrical fields.

Figure 10:
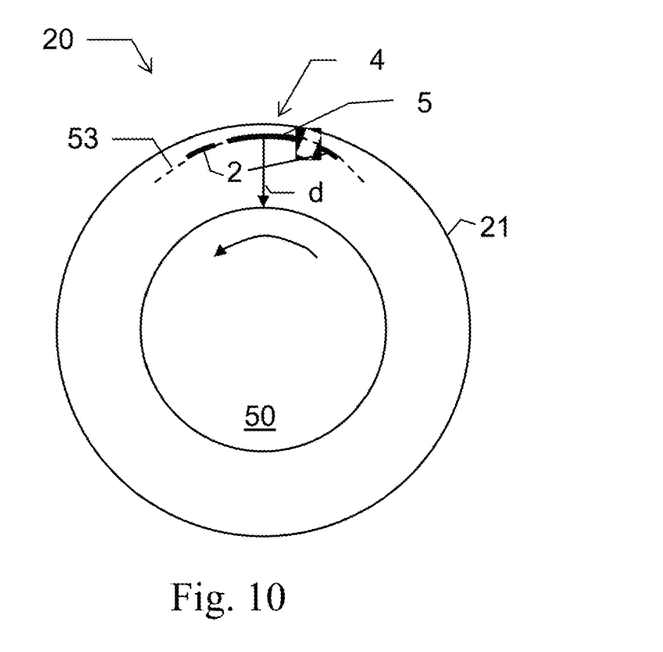

FIG. 10 schematically shows in cross-section and in plan view an example for the application of a distance sensor 4 according to the invention in a precision bearing 20. The bearing 20 is a rotary bearing. The sensor 4 is used to monitor the distance d between the inner ring 50 and outer ring 21 of the bearing 20. In accordance with the invention the sensor 4, besides the main electrode 5, which together with the opposite inner ring 50 forms a capacitance, also has a compensation electrode 2 divided into two parts, which together with the inner ring 50 forms a further capacitance. The electrode 2 is separated from the sensor electrode 5 and is assigned thereto in such a way that the two electrodes 2, or the three electrodes form a curved plane 53. The compensation electrode 2 is formed in accordance with the above-explained principles in such a way that both deviations of the sensor 4 from an ideal position and edge effects of the sensor electrode 5 can be compensated on the basis of the compensation capacitance of the compensation electrode 2, such that the distance d can be monitored in a highly precise manner.

Figure 11:
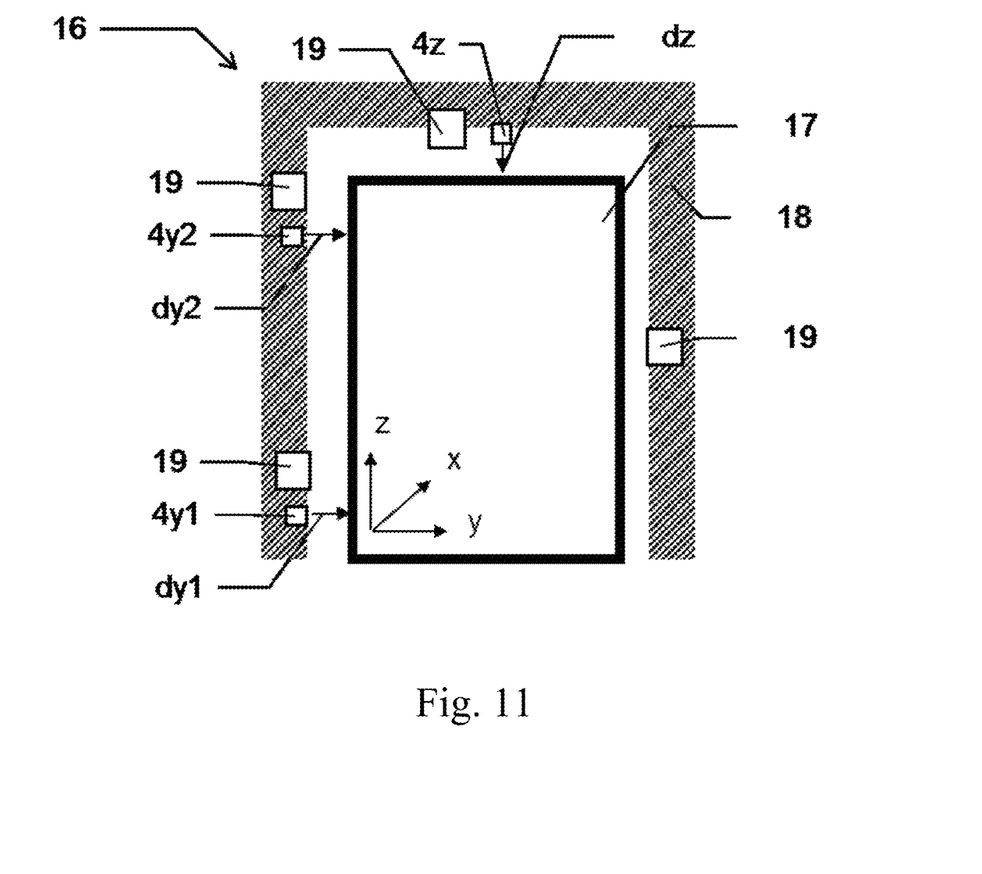

FIG. 11 schematically shows a side view of a precision bearing system 16 of a linear axis x, which is equipped with capacitive distance sensors according to the invention 4z, 4y1, 4y2. The precision bearing 16 in the example is an air bearing, which for example is used in the linear drive of a portal coordinate measuring machine or CNC machine.

What is shown is a rectangular beam structure, which is used as a guide 17 in the direction x of the desired linear displacement movement. The object that is displaceable relative to the object 17 is the carrier 18 provided for movement in the x direction. This carrier is supported at a distance from the guide 17 by compressed air openings 19 generating an air cushion, such that practically friction-free movement as possible.

The spacing or distance of the two objects 17 and 18 in the z direction (dz) and y direction (dy1 dy2) provided in a particular x position, in the case of application in a CMM, influences the 3D coordinates to be determined of the workpiece to be measured, which is situated on the measurement table; the distances life example in the order of a few micrometers to 100 micrometers or at most 1000 micrometers. In order to compensate for deviations from the target distances or ideal distances or in order to determine the particular distance dz and dy1, dy2, for example with nanometer precision and include this in the calculation of 3D coordinates, the bearing 16 in the example has three capacitive distance sensors according to the invention 4z, 4y1, 4y2, which are attached to or in the carrier 18 and progressively or continuously measure the distance dz and dy1, dy2 from the guide 17 perpendicular to the direction of movement x, or monitor it in real-time or in situ, i.e. also during the movement of the two objects 17 and 18 relative to one another. For example, the distances dz and dy1, dy2 can thus also be determined with each 3D coordinate acquisition or can be recorded with a certain measurement frequency during the entire measurement procedure or the entire production process of the workpiece.

The measurement or manufacture for example of a coordinate measuring machine or manufacturing machine into which the bearing system 16 is installed can thus advantageously be performed precisely even in the event of adverse ambient influences, such as fluctuations in temperature or vibrations or as a result of imprecise manufacture of the bearing 16, and the demands on manufacturing tolerances of the bearing 16 can be reduced; this is also possible particularly since, on account of the tilt compensation according to the invention (see FIG. 1b) of the capacitive distance sensor 4z, 4y1, 4y2, even the installation thereof on or in the carrier 18 can be provided with a relatively large tolerance.

The measured distances dy1, dy2 and dz are thus used for precise position determination of the carrier 18 and monitoring of the positioning accuracy thereof. Any deviations in the y direction and z direction can thus be determined and compensated.

In addition, by means of the two capacitive distance sensors 4y1, 4y2 mounted along the z direction, further deviations of the linear bearing 16 are additionally determined and compensated. By means of the two sensors 4y1, 4y2 along the z axis, rotation such as rolling errors about the z axis are monitored and compensated. As a further option (not shown), the bearing has further additional distance sensors, mounted on the carrier 18 for example in a manner distanced in the x direction, which are used for compensation of further errors (pitching, yawing) and to further increase the precision.

It goes without saying that these shown figures schematically show merely possible exemplary embodiments. The various approaches can also be combined with one another in accordance with the invention and combined with corresponding devices and methods of the prior art.

What is claimed is:

1. A capacitive distance measuring sensor for measuring a distance to an object, wherein the capacitive distance sensor comprises:
   at least one first planar sensor electrode, wherein the at least one first planar sensor electrode is designed, together with an opposite area of the object, to form a capacitance dependent on the distance, such that the distance is determined on the basis of a capacitance measurement; and
   at least two edge effect compensation electrodes separate from and assigned to the at least one first planar sensor electrode, wherein the first planar sensor electrode and the separate at least two edge effect compensation electrodes lie in a plane and the separate at least two edge effect compensation electrodes have together the same perimeter but different area as the first planar sensor electrode, such that measurement errors which are caused by capacitive edge effects of the first planar sensor electrode i.e. deviations from an ideal edgeless or infinitely extended first planar sensor electrode is compensated on the basis of the capacitance of the separate at least two edge effect compensation electrodes.

2. The capacitive distance measuring sensor according to claim 1, wherein the at least two edge effect compensation electrodes are also designed for the compensation of deviations from an ideal parallelism.

3. The capacitive distance measuring sensor according to claim 1, wherein the capacitive distance sensor also comprises at least one second planar sensor electrode which in comparison to the first planar sensor electrode has the same capacitance and is electrically responsive identically but oppositely, such that the distance is determined with the aid of the at least one first planar sensor electrode and the at least one second planar sensor electrode on the basis of a differential capacitance measurement.

4. The capacitive distance measuring sensor according to claim 3, wherein the distance sensor further comprises four integrators, such that in each case the first and second planar sensor electrode and two compensation electrodes are read simultaneously.

5. The capacitive distance measuring sensor according to claim 3, wherein the first and second planar sensor electrodes and compensation electrodes together form a circular arrangement which is symmetrical in the plane, wherein the first and second planar sensor electrodes form circle segments and the compensation electrodes are arranged externally, concentrically around the first and second planar sensor electrodes.

6. The capacitive distance measuring sensor according to claim 3, wherein the first and second planar sensor electrodes and the compensation electrodes have contact holes for electrical contacting and the number of contact holes in the compensation electrodes is equal to the number of contact holes in the first and second planar sensor electrodes, wherein the first and second planar sensor electrodes have the same number of contact holes.

7. The capacitive distance measuring sensor according to claim 1, wherein the capacitive distance sensor further comprises electrically shielded lines for electrically contacting the at least one first planar sensor electrode or at least one separate tilt compensation electrode, wherein the electrically shielded lines can be switched to the same electrical potential as the at least one first planar sensor electrode or at least two separate tilt compensation electrodes or the capacitive distance sensor has at least one passive electrical shielding electrode at a fixedly defined electrical potential.

8. The capacitive distance measuring sensor according to claim 1, wherein the capacitive distance sensor is designed for continuous real-time measurement of the distance from the object or has a linear response behavior by means of the compensability.

9. A precision bearing with two parts movable relative to one another, wherein the precision bearing has at least one capacitive distance measuring sensor according to claim 1 for measuring at least one distance between the two movable parts.

10. The precision bearing according to claim 9, wherein the precision bearing has at least two capacitive distance measuring sensors arranged at a distance from one another, such that a deviation from an ideal parallelism of the two movable parts relative to one another can be compensated.

11. The precision bearing according to claim 9, wherein the precision bearing is designed as a translation bearing, which has at least two capacitive distance measuring sensors arranged at a distance from one another in an axis (y) perpendicular to the linear axis (x), such that rotations about the linear axis (x) can be compensated.

12. The precision bearing according to claim 9, wherein the precision bearing is intended for use in a high-precision meter.

13. A method for continuously determining a distance between two machine parts, which are intended for parallel displacement relative to one another, the method comprising:
   measuring the distance between
   two machine parts using a capacitive distance sensor comprising:
      at least one first planar sensor electrode, wherein the first planar sensor electrode is designed, together with an opposite area of the object, to form a capacitance dependent on the distance, such that the distance is determined on the basis of a capacitance measurement; and at least two edge effect compensation electrodes separate from and assigned to the at least one first planar sensor electrode, wherein the first planar sensor electrode and the separate at least two edge effect compensation electrodes lie in a plane and the separate at least two edge effect compensation electrodes have together the same perimeter but different area as the first planar sensor electrode, such that measurement errors which are caused by capacitive edge effects of the first planar sensor electrode i.e. deviations from an ideal edgeless or infinitely extended first planar sensor electrode is compensated on the basis of the capacitance of the separate at least two edge effect compensation electrodes.

14. A non-transitory computer readable medium which contains instructions that are executed by a processor to perform the method according to claim 13.

* * * * *